S. A. ROUSSEAU.
AUTOMATIC COUPLING FOR FLUID CONDUCTING PIPES OF RAILWAY CARS.
APPLICATION FILED MAR. 7, 1919.

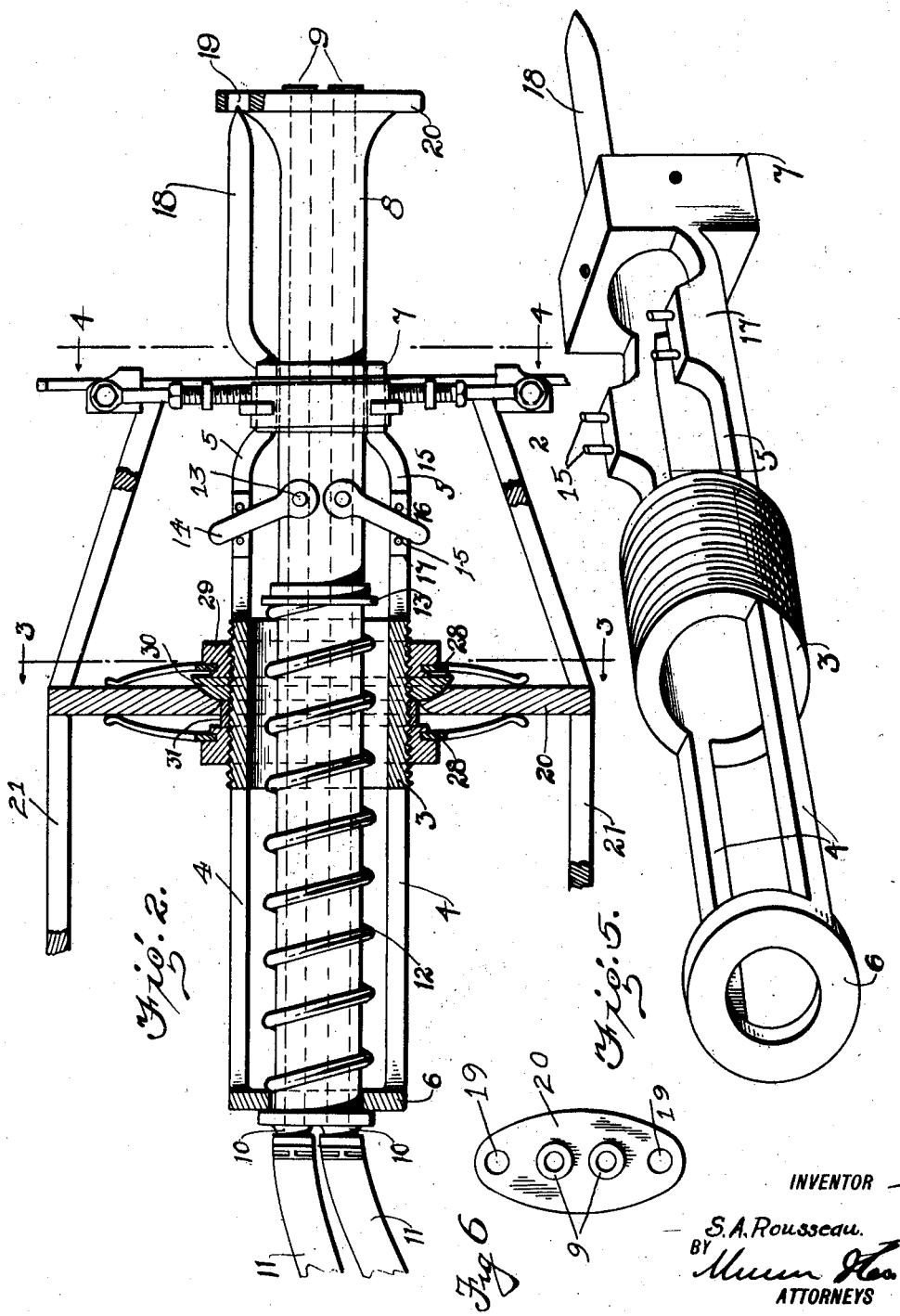

1,339,042.  Patented May 4, 1920.
2 SHEETS—SHEET 1.

WITNESSES

INVENTOR
S. A. Rousseau
BY
ATTORNEYS

UNITED STATES PATENT OFFICE.

SIDNEY AUGUSTIN ROUSSEAU, OF NEW ORLEANS, LOUISIANA.

AUTOMATIC COUPLING FOR FLUID-CONDUCTING PIPES OF RAILWAY-CARS.

1,339,042.  Specification of Letters Patent.  Patented May 4, 1920.

Application filed March 7, 1919. Serial No. 281,110.

*To all whom it may concern:*

Be it known that I, SIDNEY A. ROUSSEAU, a citizen of the United States, and a resident of New Orleans, in the parish of Orleans and State of Louisiana, have made certain new and useful Improvements in Automatic Couplings for Fluid-Conducting Pipes of Railway-Cars, of which the following is a specification.

My invention is an improvement in automatic couplings for railway cars for fluid conducting pipes, as for instance air, water (hot and cold) or steam, and the invention has for its object to provide mechanism of the character specified which will connect the pipes when the cars are coupled, and will open the valves which are used to close the pipes when uncoupled, and which, when the cars are uncoupled will close the valves to shut off the passage of the fluid.

In the drawing:

Fig. 2 is a longitudinal section through one of the coupler sections;

Figure 3:
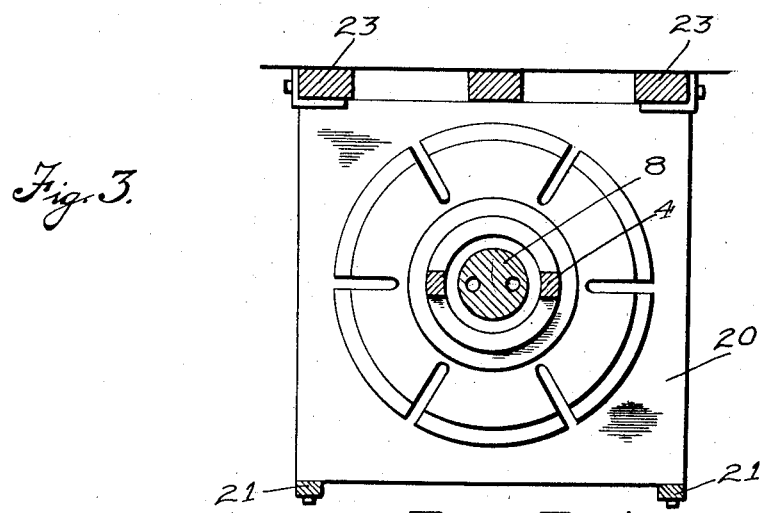
Figure 4:
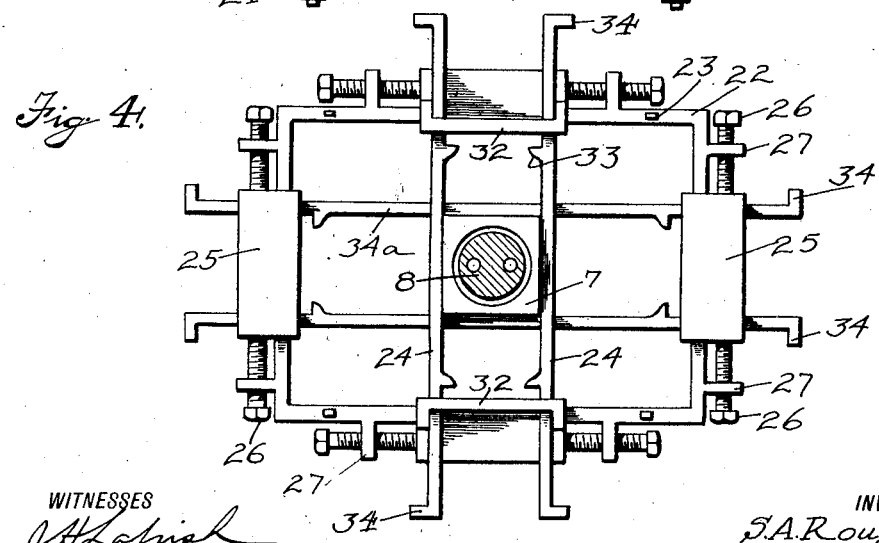

Figs. 3 and 4 are sections on the line 3—3 and 4—4 respectively of Fig. 2;

Fig. 5 is a perspective view of one of the coupler frames removed from its mounting.

Fig. 6 is an end view of one of the coupler heads.

The present embodiment of the invention is shown in connection with railway cars 1 of usual construction, having the usual automatic couplers indicated at 2. Each coupler section comprises a head to be described, and a supporting frame consisting of a sleeve 3 externally threaded as shown, and having a pair of longitudinally extending arms 4 and 5, respectively, at each end, the arms 4 supporting a ring 6 coaxial with the sleeve 3 while the arms 5 support a block 7 having an opening coaxial with that of the bore of the sleeve.

This frame slidably supports the coupler head 8 which carries passages shown as two in number, but depending upon the various fluids to be conducted, said passages extending longitudinally of the head and opening by nipples 9 and 10, at the ends of the head. The nipples 10 are connected by hose 11 with the train pipes, which are carried by the cars, and the nipples 9 are adapted to engage with the nipples of the adjacent head to connect the bores or passages through the head. Each coupler engages the block 7 of the supporting frame, and the head is normally pressed away from the car, that is, toward the coöperating head, by a coil spring 12 which encircles the head between a stop 13 on the head and the ring 6.

The bores in the head are controlled by valves arranged transversely of the head, which have stems 13' provided with radial arms 14. These arms 14 extend outwardly and engage between the pins 15 on the arms 5 of the frame. The arrangement is such that when the coupler head is moved longitudinally with respect to its supporting frame, the arms 14 will be swung and the valves will be operated to open or close the passages through the head in accordance with the direction of movement of the head.

During the operation of coupling, that is, when the head 8 moves toward the car, the valves will be opened, while when the head moves away from the car, as it would do when released the valves will be closed. Each block 7 has a longitudinally extending guide pin 18, which is adapted to engage an opening 19 in the flange 20, the said flange having an opening at each end as shown in Fig. 6. The first movement of the head inward causes the pin 18 to engage with the opening 19, and these pins lock the heads making a sealed joint, and eliminating friction under all strains caused by the different motions of the car, namely, up and down, rocking and on curves.

Figure 1:
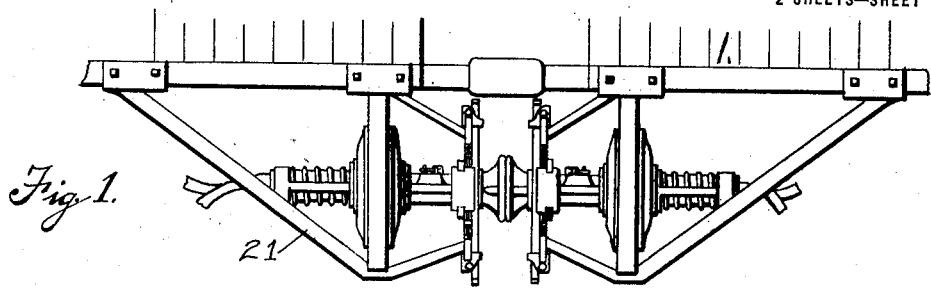
Figure 1 is a side view showing the couplers in coupled position.

The supporting frame for the coupler head is connected to the car by means of a bracket composed of a plate 20 having an opening through which the sleeve 3 extends. The plate is secured to the car as shown in Fig. 1, and the plate is braced by angle arms 21 connected at one end to the car in rear of the plate and intermediate their ends to the lower edge of the plate. These arms extend outwardly beyond the plate as shown in Fig. 2, and assist in supporting an open rectangular frame 22. This frame incloses the coupler head and supporting frame at the edge of block 7, and the frame is further supported by arms 23 which extend outward from the top of the plate 20.

The block or head 7 is supported in the frame by pairs of bars 24 and 24ª, the pair 24 being arranged vertically while the pair 24ª is arranged horizontally, and the members of both pairs are spaced apart from each other. The pair of bars 24 are arranged on one face of the frame, while the pair 24ª is arranged on the other face, and each pair is supported by a pair of plates 25 arranged at the ends of the pair of bars and connected to the frame by set screws 26. These set screws are threaded through lugs 27 extending outwardly from the frame and are rotatably connected at their inner ends with the plate. The bars 24 and 24ª pass through openings in laterally extending flanges 32 on the plates. Each bar has at each end an outwardly extending lug 34, which is adapted to limit the sliding movement of the bar with respect to the frame. The bars are further limited by lugs 33 on their inner sides and on the inner side of the flanges. These bars 34 and 34ª are resilient so that they may move within a limited degree under the movement of the head.

Each supporting frame is yieldingly connected with the plate 20 by the mechanism shown in Fig. 2. The opening through the plate for the frame is of greater diameter than the external diameter of the sleeve 3, and each face of the plate is engaged by a resilient washer 28 connected with the sleeve. Each of these washers as shown more particularly in Fig. 3, is split radially from its periphery inward at regular intervals, and each washer is cupped so that the peripheral edge of the washer will engage the plate while the ring is spaced apart therefrom. The rings are held in annular grooves in collars 29, which are threaded on to the sleeve at each end thereof, and washers 30 and 31 are arranged between the collars, the said washers abutting at their adjacent face and the said washers are threaded on to the sleeve. One of these washers has a cylindrical outer surface as shown, and the other is rounded on that face adjacent to the plate.

The opening through the plate is reamed at the collar 30 to fit its rounded face and it is also reamed at the other end at collar 31.

In operation, when the collars are moved together to couple them, the outer ends of the heads 8 will engage and the nipples 9, which are resilient will form a fluid tight junction. As the cars move together the heads 8 will be forced inwardly against the resistance of the spring 12, being guided in their inward movement by the guide pins 18. The valves will be opened by the movement of the head with respect to the supporting frame, thus completing the coupling and connecting the drain pipes by the act of coupling.

The pins 18 make a solid joint, taking the strain off the heads and eliminating friction from the different motion of cars on gaskets of the pipes. The tapering points of the pins insure their engagement regardless of slight displacements of the heads with respect to each other. Each coupler is supported intermediate its ends in such manner that it is balanced, thus providing a limited movement in every direction to compensate for bad adjustments. The washers 28 always tend to hold the coupling head and its supporting head in a certain predetermined position. The limited movement that is permitted at the rings 22 will also be compensated for when the parts are at rest.

I claim:—

1. A coupling for train pipe sections comprising a casing having at one end a head adapted to abut the head of the casing of the other section, a supporting frame in which the casing is slidable, a spring arranged between the casing and the frame and normally pressing said casing toward the other section, a fixed support connected to the car in which the frame is supported with the axis of the casing parallel with the long axis of the car, said frame being yieldingly connected with the support and having a limited rocking movement with respect thereto, means for adjusting said frame longitudinally of the support, said casing having a plurality of passages for motive fluid, and a valve for controlling each passage, and means controlled by the movement of the casing with respect to the frame for opening and closing the valves.

2. A coupling for train pipe sections comprising a casing adapted for connection with the train pipe at one end and having at the other end a head for abutting the head of the casing of the other section, a frame in which the casing is mounted to slide longitudinally, a support for the frame for connection with the car, said support having intermediate its ends a plate provided with an opening through which the frame passes, and having an open frame at one end through which the casing frame passes, means at the plate for connecting the casing frame to the support and adjustable with respect to the casing frame, and means in connection with the frame of the support for supporting the casing frame at the center of said support frame and adjustable with respect to said support frame laterally and vertically.

3. A coupling for train pipe sections comprising a casing for connection with the train pipe at one end and having means at the other end and engaging the adjacent section to connect said sections, a frame in which the casing is mounted to move longitudinally, a spring normally pressing the casing away from the train pipe connection, a support for the casing frame, said support having a plate intermediate its ends through which the casing frame passes, means for adjustably connecting said casing frame to the plate and for permitting a rocking movement of the frame with respect to the plate and for normally holding the casing frame with the axis of the casing perpendicular to the plate, and means at that end of the support remote from the train pipe for adjusting said casing vertically or laterally in either direction.

4. A coupling for train pipe sections comprising a casing for connection with the train pipe at one end and having means at the other end for engaging the adjacent section to connect said sections, a frame in which the casing is mounted to move longitudinally, a spring normally pressing the casing away from the train pipe connections, a support for the casing frame, said support having a plate intermediate its ends through which the casing frame passes, means for adjustably connecting said casing frame to the plate and for permitting a rocking movement of the frame with respect to the plate and for normally holding the casing frame with the axis of the casing perpendicular to the plate, said means comprising rings threaded onto the frame at opposite sides of the plate, and resilient cupped washers connected with the rings and engaging opposite faces of the plate, said washers being slotted radially at their peripheries.

5. A coupling for train pipe sections comprising a casing for connection with the train pipe at one end and having means at the other end for engaging the adjacent section to connect said sections, a frame in which the casing is mounted to move longitudinally, a spring normally pressing the casing away from the train pipe connections, a support for the casing frame, said support having a plate intermediate its ends through which the casing frame passes, means for adjustably connecting said casing frame to the plate and for permitting a rocking movement of the frame with respect to the plate and for normally holding the casing frame with the axis of the casing perpendicular to the plate, said means comprising rings threaded onto the frame at opposite sides of the plate, and resilient cupped washers connected with the rings and engaging opposite faces of the plate.

6. A support for train pipe coupling sections comprising a frame in which the casing may be mounted to slide longitudinally thereof, a support plate having an opening through which the frame passes and adapted for connection with the casing, means for rockably connecting the frame to the plate and for normally holding the frame with its axis perpendicular to the frame, said means comprising rings mounted on the frame on opposite sides of the plate and carrying cupped resilient washers engaging the plate at their peripheries, said plate having rigidly connected therewith in spaced relation an open frame through which the casing section frame passes, pairs of bars arranged vertically and horizontally and adjustably connected with the open frame, the members of each pair being arranged on opposite sides of the casing frame.

7. A support for train pipe coupling sections comprising a frame in which the casing may be mounted to slide longitudinally thereof, a supporting plate having an opening through which the frame passes and adapted for connection with the casing, means for rockably connecting the frame to the plate and for normally holding the frame with its axis perpendicular to the frame, said means comprising rings mounted on the frame on opposite sides of the plate and carrying cupped resilient washers engaging the plate at their peripheries.

SIDNEY AUGUSTIN ROUSSEAU.

Witnesses:
S. A. THIEND,
V. CANN.